United States Patent [19]

Kammiller

[11] Patent Number: 4,855,890
[45] Date of Patent: Aug. 8, 1989

[54] POWER FACTOR CORRECTION CIRCUIT
[75] Inventor: Neil Kammiller, Lakewood, Ohio
[73] Assignee: Reliance Comm/Tec Corporation, Chicago, Ill.
[21] Appl. No.: 265,327
[22] Filed: Oct. 27, 1988

Related U.S. Application Data

[63] Continuation of Ser. No. 66,121, Jun. 24, 1987, abandoned.

[51] Int. Cl.⁴ .............................................. H02M 1/12
[52] U.S. Cl. ...................................... 363/44; 363/126
[58] Field of Search ..................... 363/21, 43, 44, 47, 363/48, 79, 80, 81, 82, 89, 124, 126; 323/208, 209, 210, 211

[56] References Cited

U.S. PATENT DOCUMENTS

| | | | |
|---|---|---|---|
| 3,365,657 | 1/1968 | Webb | 323/206 |
| 4,074,344 | 2/1978 | Pitel | 363/89 X |
| 4,193,111 | 3/1980 | Wester | 323/211 X |
| 4,222,096 | 9/1980 | Capewell | 363/44 |
| 4,384,321 | 5/1983 | Rippel | 363/124 |
| 4,412,277 | 10/1983 | Mitchell | 363/81 |
| 4,437,146 | 3/1984 | Carpenter | 363/21 |

FOREIGN PATENT DOCUMENTS 1934980 1/1971 Fed. Rep. of Germany .

OTHER PUBLICATIONS

Steve Smith, "Power Factor Correction I, II, III", Jan. Feb. and Mar. 1987.
California Institute of Technology, Power Electronics Group, "Input-Current Shaped AC-to-DC Converters", May 1986.

Primary Examiner—Patrick R. Salce
Assistant Examiner—Kristine Peckman
Attorney, Agent, or Firm—Michael M. Rickin

[57] ABSTRACT

A power factor correction circuit for an off line supply of the switch mode type. In its simplest form the circuit is made up of a capacitor and an inductor. The capacitor is to be connected to the input rectifier of the supply. The capacitor is in aiding relationship for each half cycle of the line voltage. When so connected, a unidirectional current flows from the rectifier to charge the bank capacitors of the supply. The inductor is to be connected to at least the rectifier. The inductor causes the amplitude of the unidirectional current to increase and decrease at a rate which is less than it would be if the inductor was not so connected.

Embodiments having at least two capacitors which are controlled to be switched in and out of the correction circuit as well as one or more inductors which may or may not be controlled are also disclosed.

31 Claims, 6 Drawing Sheets

POWER FACTOR CORRECTION CIRCUIT

This is a continuation of co-pending application Ser. No. 066,121 filed on June 24, 1987, now abandoned.

BACKGROUND OF THE INVENTION

1. Field of the Invention

This invention relates to power factor correction and more particularly to circuit for providing such correction in a power supply.

2. Description of the Prior Art

Switch mode power supplies of the off-line AC to DC converter type are used in a wide variety of applications. Such supplies may be used in the computer industry to run computers and peripherals or in the telecommunications industry as a battery charger or eliminator. No matter where such supplies are being used, there is a growing awareness of the power factor correction problem.

In a typical power supply of the off-line AC to DC converter type, the input current to the supply is essentially in phase with the input voltage to the supply. The input current does, however, have a very high harmonic content. Power factor is defined as the ratio of the input watts to the product of the RMS values of the input voltage and input current. The ratio is affected by the phase relationship of the fundamental of the input voltage and input current and the harmonic content of the input current. As a result of the very high harmonic content in the input current, the power factor for the typical converter type power supply may be in the order of 0.62. Ideally, that power factor should be unity. It is therefore desirable to include in the power supply circuitry which attempts to correct the power factor and make it as close to unity as is possible.

There have been numerous attempts in the art to design power factor correction circuits. Several such correction circuits and the power supplies in which they are used are described in U.S. Pat. Nos. 3,365,657; 4,193,111; 4,437,146; 4,384,321 and 4,412,277.

In the U.S. Pat. No. 3,365,657, the power factor correction circuit described therein is used to correct the power factor of a highly reactive variable load as seen by the power amplifying elements of the power supply. Such correction is accomplished by including in the output transformers, control windings which have a direct current applied thereto. That current is a function of the load circuit and varies the self inductance of the output transformers in such a manner as to provide a unity power factor as viewed from the transistors. The circuit described in the U.S. Pat. No. 4,193,111 accomplishes power factor correction by selectively operating switches to effectively connect an inductor to the positive or negative terminal of a storage capacitor or to zero volts, depending on the relationship of the current to a reference currents and whether the voltage across the AC ports is positive or negative. The U.S. Pat. Nos. 4,437,146, 4,384,321 and 4,412,277 describe other equally as complicated schemes for correcting power factor.

A further discussion of power factor and correction circuits therefor may be obtained by referring to the following publications:

(1) "Power Factor Correction—I"; "Power Factor Correction—II"; and "Power Factor Correction—III" Steve Smith, PCIM Magazine January 1987, February, 1987 and March 1987 respectively.

(2) "Input—Current Shaped Ac-to-Dc Converters", Final Report, California Institute of Technology, Power Electronics Group, May 1986, available from the National Technical Information Service as Document number N86-25693.

Figure 1:
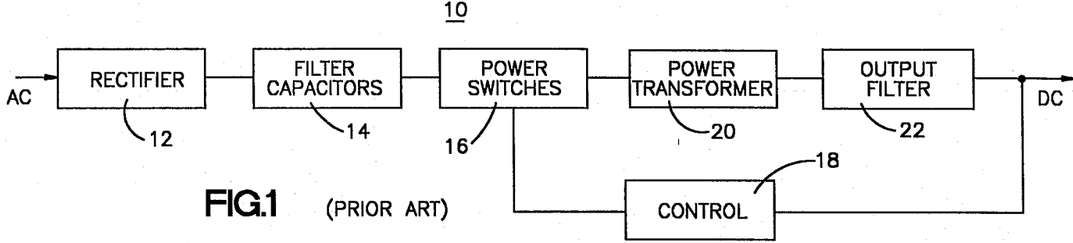
FIG. 1 shows a simplified block diagram of a prior art AC to DC converter type switch mode power supply.

Referring now to FIG. 1, there is shown a simplified block diagram of the well known AC to DC converter type switch mode power supply 10. Supply 10 includes a rectifier 12 which converts the AC input voltage into a DC voltage. Connected to rectifier 12 are input filter capacitors 14. The capacitors 14, also known as energy storage capacitors, smooth the DC voltage. The voltage appearing thereacross is sometimes referred to as the bank voltage. Power supply 10 also includes power switches 16 which operate in the switch mode and provide the power conversion. The operation of the switches is controlled by control 18. The output voltage and current resulting from the operation of the switches is connected to the output side of power supply 10 by power transformer 20. Output filter 22 is used to filter the voltage and current appearing at the output of the supply. Control circuit 18 also includes a driving circuit (not shown) which is used to provide the actual signals to switch power switches 16.

Figure 1A:
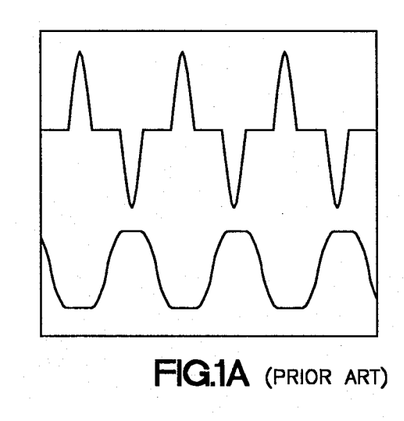
FIG. 1A shows the waveforms for the input current and voltage to the supply of FIG. 1.

Referring to FIG. 1A there is shown waveforms for the input current and input voltage to power supply 10. The waveforms shown therein are for supply 10 operating at essentially full load. As can be seen while the input current and input voltage are essentially in phase with one another the input current has a high harmonic content. As a result, the power factor of supply 10 is in the order of 0.62. The efficiency of supply 10 is in the order of 89.3%.

Power supply 10 of FIG. 1 does not include a power factor correction circuit. It is however, desirable that supply 10 include such a circuit. In addition, it is also desirable that such a circuit be relatively easy to implement and also be easily retrofittable into previously designed power supplies. It is also desirable that the basic architecture of the power factor correction circuit be expandable so that power factor correction can be provided over part or all of the operating range of supply 10. It is additionally desirable that the power factor correction circuit have minimal effect on the efficiency of supply 10, does not introduce any new radio frequency (r.f.) signals in the supply and also have the capability to suppress r.f. signals presently in the supply. The power factor correction circuit of my invention has these characteristics.

SUMMARY OF THE INVENTION

A power factor correction circuit for connection to an offline power supply of the switch mode type. The supply has an input connected to an AC line voltage, a rectifier connected to the input and energy storage capacitors connected to the rectifier.

The power factor correction circuit is made up of one or more capacitors and one or more inductors. The capacitors are to be connected to the rectifier. When they are so connected, unidirectional current from the rectifier is used to charge the energy storage capacitors. The power factor correcting capacitors have an initial charge for each half cycle of the line voltage which is aiding relationship thereto. During each half cycle the power factor correction capacitors are given a charge so that at the beginning of the next half cycle they have the initial charge.

The inductors are to be connected to at least the rectifier. When they are so connected, then in each half cycle the unidirectional current first increases and then decreases in amplitude at rates which are slower than the rate of increase or decrease of that current when the inductors are not so connected.

DESCRIPTION OF THE PREFERRED EMBODIMENTS

Figure 2:
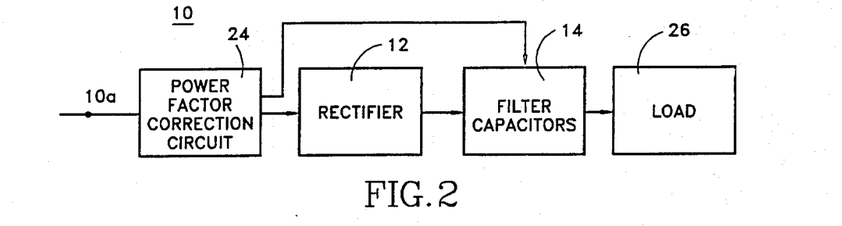
FIG. 2 shows a block-schematic diagram for a part of the power supply of FIG. 1 including the basic power factor correction circuit of the present invention.

Referring now to FIG. 2, there is shown the block schematic diagram for power supply 10 of FIG. 1 redrawn to include the basic power factor correction circuit 24 of my invention. In redrawing FIG. 1, all of the circuitry in power supply 10 which is to the right of filter capacitors 14 has been put into a single block 26 labelled "LOAD". Therefore, LOAD 26 includes power switches 16; control circuit 18; power transformer 20; and output filter 22 of supply 10.

As shown in FIG. 2, power factor correction circuit 24 is connected between the AC input voltage to supply 10, rectifier 12 and filter capacitors 14. As will be described hereinafter in more detail in connection with FIG. 3, circuit 24 may be embodied in its simplest form as the combination of an inductor and a capacitor. Also, as will be described in more detail hereinafter, circuit 24 can be used not only to provide power factor correction, but also to suppress r.f. signals at the input to power supply 10.

Figure 3:
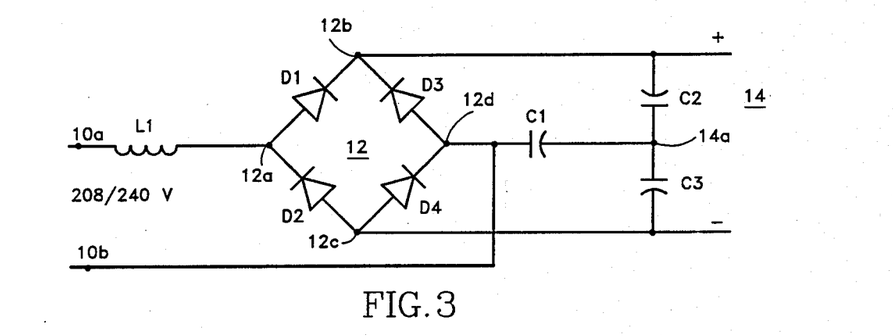
FIG. 3 shows the embodiment for the basic form of the power factor correction circuit shown in FIG. 2.

Referring now to FIG. 3 there is shown the embodiment for the basic form of power factor correction circuit 24 for use in a power supply 10 having an AC input voltage in the order of 208 V/240 V. As described in connection with FIG. 2, circuit 24 is connected between the input 10a for supply 10, rectifier 12 and input filter capacitors 14 thereof. More particularly, circuit 24 consists of an inductor L1 and a capacitor C1. Rectifier 12 is a full-wave rectifier made up of diodes D1, D2, D3 and D4 connected in a bridge. Inductor L1 is connected between input 10a and junction 12a of rectifier 12.

Filter capacitors 14 is made up of the capacitors C2 and C3. C2 and C3 are connected in series to junctions 12b, 12c of the diodes in rectifier 12. Power factor correction capacitor C1 is connected to the midpoint 14a of the filter capacitors C2 and C3 and the junction of input 10b and rectifier bridge junction 12d. The LOAD 26 (not shown) is connected across the filter capacitors C2 and C3.

At the start of each half cycle of the AC input voltage to supply 10, capacitor C1 has on it a charge with a polarity such that it is in aiding relationship to the line voltage. Capacitor C1 is connected to rectifier 12 in a manner such that it causes unidirectional current to flow into capacitors C2 and C3 on each half cycle. By the beginning of the next half cycle of the input voltage, the charge on capacitor C1 is such that it is in aiding relationship for the next half cycle. In the embodiment shown in FIG. 3 this requirement that the charge on capacitor C1 at the beginning of each half cycle be in aiding relationship for that half cycle is met by changing the polarity of the new charge on the capacitor during the previous half cycle. The inductor L1 functions to cause the unidirectional current to increase and decrease in amplitude at rates which are slower than that current would increase or decrease if L1 were not present in supply 10.

I have found that for a fixed input voltage and a properly selected LOAD that the combination of L1 and C1 shown in FIG. 3 can provide a power factor of up to 0.97. The typical uncorrected power factor is in the order of 0.62. L1 and C1 can also provide relatively good correction over some limited range of variation of the input voltage and/or the LOAD 26. While the inductor L1 is shown in FIG. 3 as connected only between terminal 10a and junction 12a, it can also be split into two inductors, one of which is connected between 10a and 12a and the other of which is connected between terminal 10b and the junction 12d of diodes D3 and D4. If the two inductors are of equal inductance with their sum being equal to the inductance of L1, then not only does circuit 24 provide power factor correction it also provides suppression of r.f. signals at the input to supply 10.

The amount of power factor correction provided by the combination of L1 and C1 does, however, fall off as the input voltage and/or LOAD vary from the fixed input voltage and the selected LOAD 26. It is therefore desirable to control the power factor correction circuit to take into account such variations. One such embodiment for circuit 24 which has that control is shown in FIG. 4.

Figure 4:
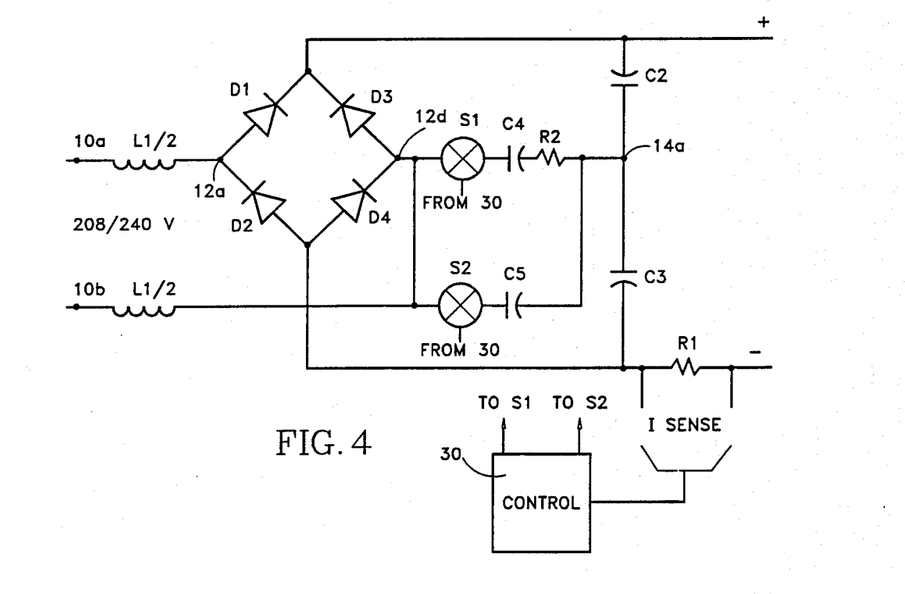
FIG. 4 shows a block-schematic diagram for the power supply of FIG. 2 which includes one embodiment for the controlled power factor correction circuit of the present invention.

Referring now to FIG. 4, there is shown a block-schematic diagram of that part of power supply 10 excluding LOAD 26 wherein circuit 24 is controlled so as to provide a correction which takes into account variations in the input voltage and/or LOAD.

As compared to the embodiment of circuit 24 shown in FIG. 3, the single correction capacitor C1 has been replaced by two capacitors C4 and C5 each having an associated series switch S1 and S2. The combination of capacitor C4 and switch S1 and the combination of capacitor C5 and switch S2 are both connected in parallel in exactly the same place in supply 10 that correction capacitor C1 of FIG. 3 is connected. The inductor L1 of FIG. 3 has been split into two equal inductors L$\frac{1}{2}$ so as to not only provide power factor correction but also suppression of r.f. signals at the input to supply 10.

Control of the power factor correction provided by circuit 24 is obtained by opening or closing switches S1 and S2 based on the current in LOAD 26. That current is representative of both changes in the input voltage and/or the current appearing at the output of supply 10. The current in LOAD 26 is sensed by the use of a resistor R1 connected as shown. A low ohmmage resistor R2 is connected in series with switch S1 and capacitor C4. The resistor R2 limits the current that flows through both of switches S1 and S2 upon the closing of either switch with the other already closed to an amplitude which does not exceed the peak surge rating of either switch.

The sensed current is provided as an input to control circuit 30. One embodiment for circuit 30 and switches S1 and S2 will be described in connection with FIG. 5. Based on the amplitude of that current, circuit 30 opens or closes switches S1 and S2 to control the power factor correction provided by circuit 24. At no LOAD 26 both switches S1 and S2 are open. When the LOAD 26 current rises to a first predetermined amplitude, e.g. 25% of the LOAD 26 current which flows when supply 10 is operating at full output power (hereinafter the full output power LOAD 26 current), circuit 30 closes switch S1 so that only capacitor C4 provides correction. When the current rises to a second predetermined amplitude, e.g. 50% of the full output power LOAD 26 current, circuit 30 closes switch S2 and opens switch S1 so that only capacitor C5 is providing correction.

When the current rises to a third predetermined amplitude, e.g. 75% of the full output power LOAD 26 current, circuit 30 closes switch S1 such that both capacitors C4 and C5 are in the correction circuit. As the current falls from the full output power LOAD 26 current the openings and closings of the switches S1 and S2 are reversed from that described above. Some hysteresis is provided in circuit 30 such that the amplitude at which switch openings and closings occur as the LOAD 26 current falls is not the same as the amplitude at which such events occur as the LOAD 26 current rises.

I have found that the controlled correction circuit of FIG. 4 provides a power factor which is substantially better than the uncorrected power factor of the typical supply 10 of FIG. 1 for all LOAD 26 conditions except for no LOAD 26. Typical values of L$\frac{1}{2}$, C4 and C5 to provide such correction in a 2500 watt power supply are 3.5 mh, 40 uf and 80 uf, respectively. While the circuit of FIG. 4 shows only two capacitors and switches in the correction circuit 24, it should be appreciated that the invention is not so limited. In addition, it may be possible to also include switches in combination with the inductor(s) in the correction circuit to provide further control. Finally, while the correction circuit 24 of the present invention has been described in connection with a power supply 10 whose input voltage is 208 V/240 V, it can be used for other input voltages, e.g. 120 V, in a slightly modified form.

Figure 5:
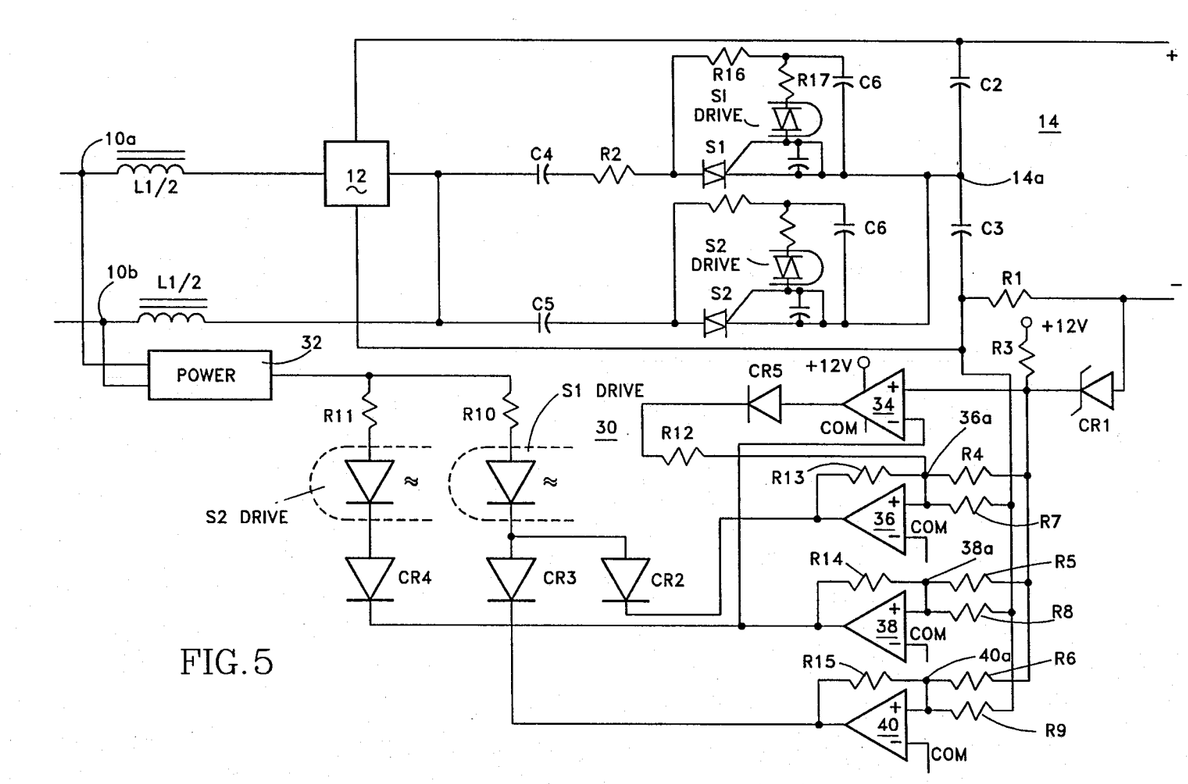
FIG. 5 shows one embodiment for the control circuit and switches of the embodiment shown in FIG. 4.

Referring now to FIG. 5 there is shown a block-schematic diagram of that part of supply 10 shown in FIG. 4 which shows one embodiment for control 30 and switches S1 and S2. These components in FIG. 5 which are identical to those shown in FIG. 4 carry the same reference designator. For ease of illustration, rectifier 12 has been shown in block diagram form. Block 32 provides from inputs 10a, 10b of supply 10 the power necessary for the operation of control circuit 30.

As described previously, resistor R1 senses the current in LOAD 26. Diode CR1 connected to one end of R1 and the non-inverting input of each of comparators 34, 36, 38 and 40 provides a 6.2 V reference voltage for comparison with the voltage representative of LOAD current from resistor R1 in comparators 36, 38 and 40. The resistor R3 provides a current source from +12 V for diode CR1.

In each of comparators 36, 38 and 40, the inverting input is connected to circuit common (COM). The resistors R4, R5 and R6 connected between the cathode of diode CR1 and the node 36a, 38a and 40a of comparators 36, 38 and 40, respectively, act to scale the voltage of diode CR1 to thereby pull the associated one of the nodes positive. The resistors R7, R8 and R9 connected between LOAD current sensing resistor R1 and the associated ones of nodes 36a, 38a and 40a, respectively, act to scale the voltage developed across R1 to thereby pull the associated one of the nodes negative. The comparators 36, 38 and 40 are then looking for either a positive or negative polarity about COM. Based on that polarity the comparators will, as described below, turn on (or off) the appropriate one of switches S1 and S2.

The turning on and off of the switches S1 and S2 is accomplished by the associated one of two drive circuits. Each drive circuit is the combination of a light emitting diode (LED) and a phototriac. For ease of reference, the LED and phototriac which make up the drive circuit for switch S1 are each identified in FIG. 5 by the reference "S1 Drive" whereas the LED and phototriac which make up the drive circuit for switch S2 are both identified in FIG. 5 by the reference "S2 Drive". The switches S1 and S2 are triacs.

The S1 Drive LED has its anode connected to power supply 32 by a resistor R10 and its cathode connected by a diode CR2 to the output of comparator 36 and by a diode CR3 to the output of comparator 40. The S2 Drive LED has its anode connected to power supply 32 by a resistor R11 and its cathode connected by a diode CR4 to both the output of comparator 38 and the inverting input of comparator 34. The comparator 34, whose function will be described below, has its output connected by the series combination of diode CR5 and resistor R12 to node 36a.

As will be described in more detail hereinafter, the flow of current through either LED will cause the associated one of the phototriacs to be energized or latch. In turn, the energizing or latching of a phototriac will cause the associated one of the switches S1 and S2 to be energized to thereby insert the associated one of the power factor correction capacitors C4 and C5 in circuit 24. When current ceases to flow through a LED, the associated one of the phototriacs is deenergized allowing it to become unlatched when the current flowing through its main terminals falls below the holding current. In turn, the associated one of the switches is deenergized and becomes unlatched when the current flowing through its main terminals falls below the holding current. The associated one of the power factor correction capacitors is then removed from circuit 24.

The operation of control circuit 30, the drive circuits and triacs S1 and S2 will now be described starting with zero LOAD current through sensing resistor R1. As the LOAD current increases, the voltage developed across resistor R1 progressively pulls the nodes 36a, 38a and 40a negative. As a result of the different resistance values selected for scaling resistors R4, R5 and R6 (R4 having the highest resistance and R6 having the lowest resistance) comparator 36 turns on first and its output goes low. This going low of the output of comparator 36 pulls current through diode CR2 and S1 Drive LED to thereby energize the S1 Drive phototriac. As a result, switch S1 is energized, i.e., latched or closed, and capacitor C4 is inserted in circuit 24.

As the current through resistor R1 continues to increase, it reaches an amplitude which is sufficient to cause the output of comparator 38 to go low. This going low of the output of comparator 38 pulls current through CR4 and S2 Drive LED to thereby energize the S2 Drive phototriac allowing it to latch S2 and insert capacitor C5 in circuit 24. As the inverting input of comparator 34 is connected to the S2 Drive LED, the voltage at that input is simultaneously lowered such that it falls below the 6.2 V reference provided by diode CR1. The output of comparator 34 then goes high to thereby pull current through the series combination of diode CR5 and resistor R12 to the noninverting input of comparator 36.

In response thereto, the output of comparator 36 goes high thereby causing current to cease flowing through S1 Drive LED. The S1 Drive phototriac is deenergized allowing it to become unlatched and switch S1 is deenergized, i.e., unlatched or opened. Capacitor C4 is then removed from circuit 24. In summary, the flow of current through S2 Drive LED has caused switch S2 to close to thereby insert capacitor C5 and has caused switch S1 to open to thereby remove capacitor C4 in power factor correction circuit 24.

Increasing current through resistor R1 eventually reaches an amplitude which is sufficient to cause the output of comparator 40 to go low. This going low of the output of comparator pulls current through diode CR3 and S1 Drive LED to thereby reenergize the S1 Drive phototriac. In turn, switch S1 is reenergized and capacitor C4 is then reinserted in circuit 24. Now both capacitors C4 and C5 are in circuit 24. Further increases of current in LOAD 26 have no effect on switches S1 and S2. Both switches remain closed and their associated capacitors remain inserted in circuit 24.

The operation of control circuit 30, the drive circuits and switches S1 and S2 will now be described as the current in LOAD 26 falls from full LOAD 26 current. As the current falls, the openings and closings of switches S1 and S2 are reversed from that described above. In order to provide the needed hysteresis in circuit 30 so that the amplitude at which switch openings and closings occur as LOAD 26 current falls is not the same as the amplitude at which such events occurs when the current rises there is included in each of comparators 36, 38 and 40 resistors R13, R14 and R15, respectively.

The resistors R13, R14 and R15 provide positive feedback in each of comparators 36, 38 and 40, respectively to thereby reduce the points at which at the switch openings and closings occur as the current falls as compared to when such events occur when the current is rising. For example, as the current falls from full LOAD 26 current, switch S1 is opened at a current amplitude which is lower than the amplitude at which S1 is closed as the current rises from that amplitude which has closed S2 and opened S1. The reason for such positive feedback for resistors R13, R14 and R15 is to overcome the instability that would otherwise results from the negative resistance effect of the constant power LOAD 26 responding to changes in the voltage across capacitors C2, C3 which results when a power factor correcting capacitor C4, C5 is switched in or out of circuit 24.

In the embodiment for the 2500 watt power supply, C4 is 40 uf, C5 is 80 uf, R1 is 0.01 ohms and R2 is 0.2 ohms. The S1 Drive and S2 Drive phototriacs and associated LED drivers were embodied using the MOC 3041 type devices available from Motorola. The switches S1 and S2 were embodied using the MAC 233-8 devices also available from Motorola and function to carry the relatively large current which flows through the associated one of correction capacitors C4 and C5. The phototriacs are not capable of carrying such large currents.

In addition, the types of devices being used herein for S1 Drive and S2 Drive are such that the phototriacs cannot turn on when the voltage across them is more than 40V. As described above in connection with FIG. 4, resistor R2 limits the current that flows through both of switches S1 and S2 upon the closing of either switch with the other already closed to be less than the peak surge rating of the triacs. Specifically, R2 limits that current to be no more than 200 amperes (40 V/0.2 ohms). The peak surge current rating of the particular type of triacs being used herein for switches S1 and S2 is 250 amperes.

Finally, there is associated with each of the phototriacs an identical circuit made up of resistors R16, R17 and a capacitor C6. That circuit controls the rate of change of voltage with time across the associated phototriac and associated switch triac.

In the embodiment being described herein the following components had the following values:

| | |
|---|---|
| R3 = 22K ohms | R13 = 1.0 M ohms |
| R4 = 292K ohms | R14 = 499K ohms |
| R5 = 86.6K ohms | R15 = 274K ohms |
| R6 = 53.6K ohms | R16 = R17 = 220 ohms |
| R7 = R8 = R9 = 1.0K ohms | |
| R10 = R11 = 475 ohms | |
| R12 = 10K ohms | |
| C6 = 0.1 uf | |

It should be appreciated that when the capacitors C4 and C5 are each in circuit 24 they function in the manner described previously for capacitor C1 of FIG. 3. Similarly, the inductors L½ function in the manner described previously for inductor L1 of FIG. 3.

Figure 6A:
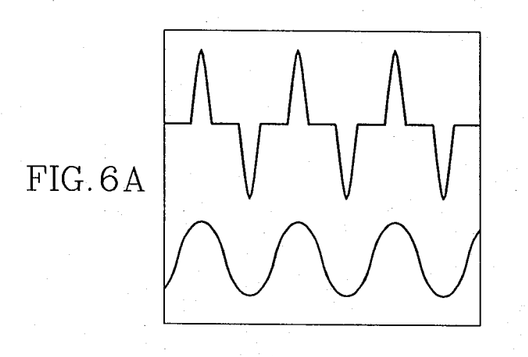
FIG. 6A, 6B, 6C and 6D show the waveforms for the input current and voltage for the power factor correction circuit shown in FIGS. 4 and 5.

Referring now to FIGS. 6A, 6B, 6C and 6D there are shown the waveforms for the input current and input voltage for supply 10 in which the embodiment of the power factor correction circuit 24 shown in FIG. 4 with the control 30 therefor shown in FIG. 5 has been used. FIG. 6A shows the input current and input voltage waveforms for supply 10 with the power factor correction circuit 24 in supply 10 but without either of capacitors C4 and C5 switched in. For this operating condition supply 10 has a power factor of 0.6967 and an efficiency of 87.2 %.

Figure 6B:
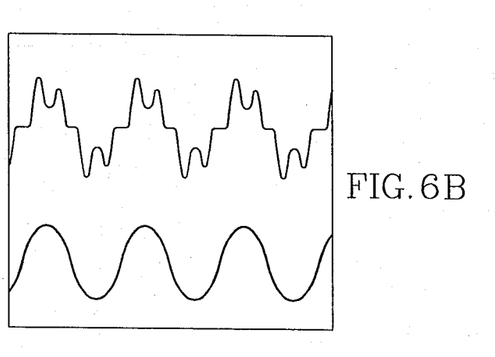
Figure 6C:
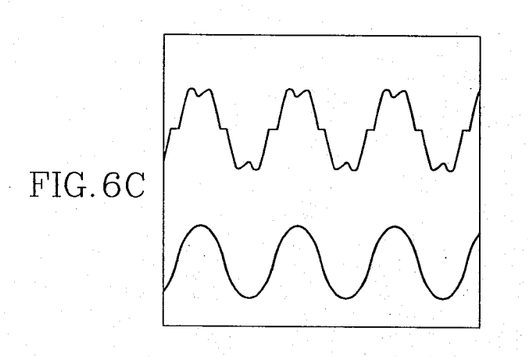
Figure 6D:
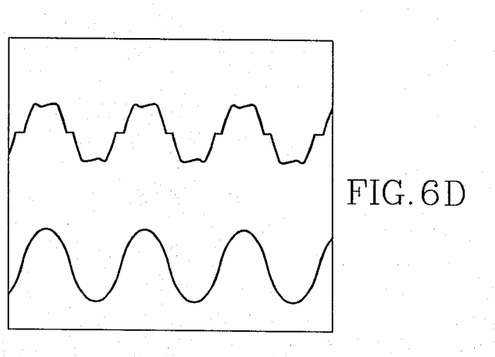

FIG. 6B shows the input current and input voltage waveforms for supply 10 just after capacitor C4 has been switched into circuit 24. For this operating condition supply 10 has a power factor of 0.7758 and an efficiency of 86.4 %. FIG. 6C shows the input current and input voltage waveforms for supply 10 just after capacitor C5 has been switched into circuit 24 and capacitor C4 has been switched out of the circuit. For this operating condition supply 10 has a power factor of 0.9250 and an efficiency of 88.6 %. FIG. 6D shows the input current and input voltage waveforms for supply 10 just after capacitor C4 has been switched into circuit 24, i.e., capacitors C4 and C5 are both in the circuit. For this operating condition, supply 10 has a power factor of 0.9583 and an efficiency of 87.5 %.

It should be appreciated that the amplitude of the input currents are shown in FIGS. 6A, 6B, 6C and 6D as being similar only for ease of illustration. As is well known the input current increases in amplitude as the LOAD 26 current in supply 10 increases. It should also be appreciated that as the waveform of the input current becomes more sinusoidal in shape thereby decreasing the harmonic content of the input current, the power factor correction provided by circuit 24 increases.

It should also be appreciated that in comparing the waveform of the input current shown in FIG. 1A and/or FIG. 6A with the waveform of the input current shown in FIGS. 6B or 6C or 6D that the effect of having either one or both of the power factor correction capacitors C4, C5 switched into circuit 24 is that the input current begins to flow closer to the beginning of each half cycle of the input voltage as compared to when it begins to flow when either circuit 24 is not present in supply 10 or when circuit 24 is present in supply 10 but neither of capacitors C4, C5 is switched in. Finally, it should be appreciated from a comparison of the input current waveforms shown in FIGS. 1A and 6A that the presence of circuit 24 in supply 10 even without either of capacitors C4, C5 switched in is beneficial in that the input current flows for a longer duration in each half cycle than it does if the circuit is not present.

Figure 7A:
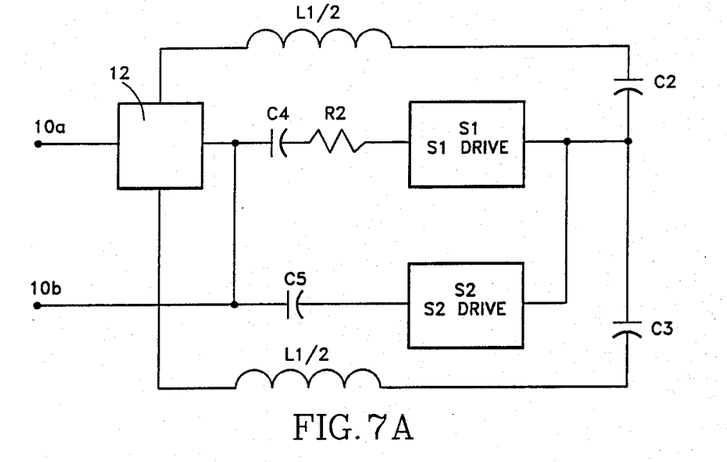
FIG. 7A, 7B and 7C show alternative embodiments for the power factor correction circuit of the present invention.

There has been shown in FIGS. 3, 4 and 5 various embodiments for the power factor correction circuit 24 wherein the one or more inductors therein are connected between the input of supply 10 and rectifier circuit 12. Referring now to FIG. 7A there is shown another embodiment for power factor correction circuit 24 wherein the inductors $L\frac{1}{2}$ of FIG. 4 are connected to the DC side of rectifier circuit 12.

While the embodiment shown in FIG. 7A does not provide the suppression of r.f. signals at the input to supply 10 provided by the embodiment shown in FIGS. 4 and 5, it does, however, otherwise function in the manner previously described for the embodiments of FIGS. 3, 4 and 5. More specifically, the inductors $L\frac{1}{2}$ still function to cause the unidirectional current which flows into the capacitors C2 and C3 to increase and decrease in amplitude at rates which are slower than that current would increase or decrease if the inductors were not present in the supply.

Figure 7B:
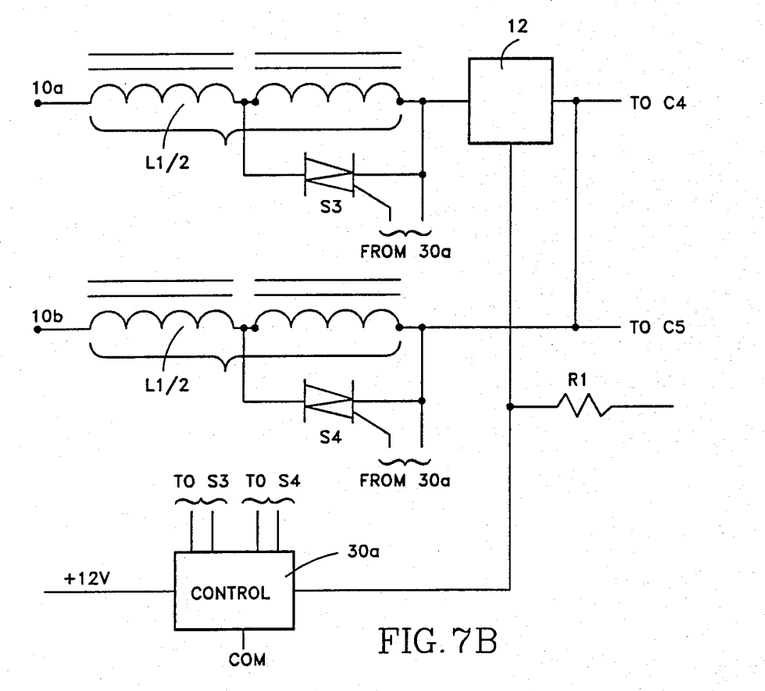
Figure 7C:
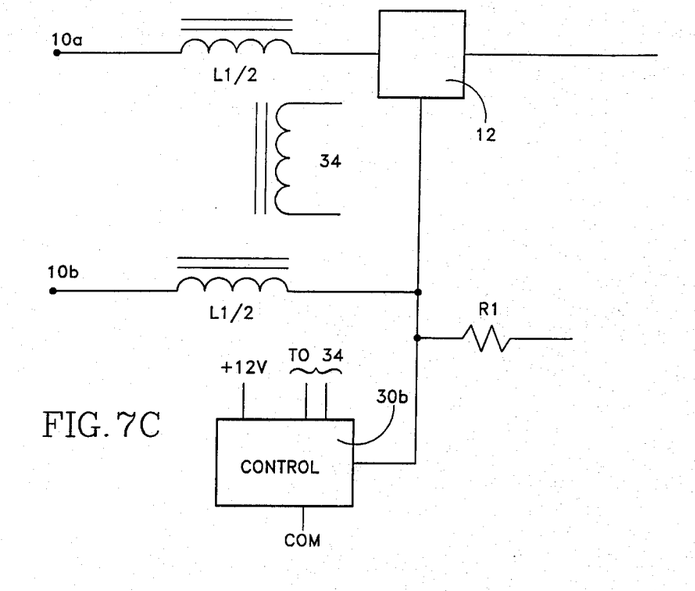

Referring now to FIGS. 7B and 7C there are shown other alternative embodiments for that shown for circuit 24 in FIGS. 4 and 5. In FIGS. 4 and 5, the power factor correction inductors $L\frac{1}{2}$ are shown as having a constant inductance. It is only the power factor correction capacitors which are switched in and out with increasing or decreasing LOAD current. The power factor correction inductors can, however, have an inductance which varies with increasing or decreasing LOAD current. Two such embodiments having variable inductors are shown in FIGS. 7B and 7C. For ease of illustration only that part of supply 10 necessary for an explanation of these embodiments has been shown in the figures.

FIG. 7B shows the embodiment wherein each inductor $L\frac{1}{2}$ has in effect been divided into two inductors one of which is unswitched and the other of which has associated therewith a triac which is controlled from a control circuit 30a. While control circuit 30a is shown in block diagram form, it should be appreciated that it can be embodied in a manner similar to the embodiment shown for control circuit 30 in FIG. 5. The input to circuit 30a is the voltage across LOAD current sensing resistor R1. Circuit 30a also includes circuitry equivalent to S1 Drive and S2 Drive of FIG. 5 to provide the signals to energize and deenergize the triacs S3 and S4 as necessary. The power factor correction inductance is controlled such that as the LOAD current goes up in amplitude, inductance is removed from the correction circuit.

While FIG. 7B has shown a power factor correction inductor made up of the series combination of a fixed inductor and a switched inductor it should be appreciated that the entire power factor correction inductor can be designed in a manner such that all or any part of it is removed from circuit 24 as the LOAD current increases.

FIG. 7C shows an alternative embodiment in which the power factor correction inductor has been embodied as a linearly variable inductor. A control circuit 30b is connected to receive the voltage developed across LOAD current sending resistor R1. A winding 34 which receives the output of circuit 30b functions as a control winding to thereby control the variable inductance. As with the embodiment shown in FIG. 7B, the inductance of the linearly variable inductor is decreased as the LOAD current increases.

Figure 8:
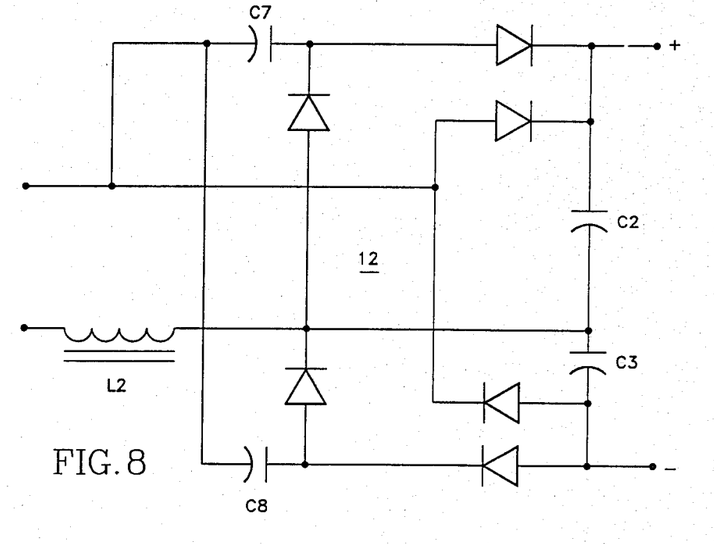
FIG. 8 shows an embodiment for the power factor correction circuit of the present invention for use in a power supply whose input voltage is 120 V.

Referring now to FIG. 8 there is shown a schematic diagram of power factor correction circuit 24 for use in a power supply 10 whose input voltage is 120 V. For ease of illustration only that part of supply 10 necessary for the explanation of circuit 24 has been shown in FIG. 8.

Circuit 24 includes an inductor L2 which is connected between one input of supply 10 and rectifier circuit 12. Circuit 24 includes two power factor correction capacitors C7 and C8 connected as shown. The capacitors C2 and C3 are the bank capacitors of filter 14.

For each half cycle of the AC input voltage to the supply, one of correction capacitors C7, C8 functions in the manner previously described for correction capacitor C1 of FIG. 3 and correction capacitors C4 and C5 of FIG. 4. That one of capacitors C7, C8 has at the beginning of the half cycle a charge on it which is in aiding relationship to the line voltage. That capacitor causes unidirectional current to flow into the bank capacitors. The other of capacitors C7, C8 is then charged during that half cycle so that at the beginning of the next half cycle it has on it the charge which is in aiding relationship to the line voltage for that half cycle. That one of capacitors C7, C8 which in a half cycle is in aiding relationship to the line voltage depends on the polarity of the voltage and the polarity of the charge on the capacitors.

The inductor L2 functions in the manner described previously for inductor L1 of FIG. 3. Thus, the inductive and capacitive components in the power factor correction circuit 24 for the 120 V supply each function in exactly the same manner as described for the corresponding components of the power factor correction circuit in the 208 V/240 V supply.

It is to be understood that the description of the preferred embodiments are intended to be only illustrative, rather than exhaustive, of the present invention. Those of ordinary skill will be able to make certain additions, deletions, and/or modifications to the embodiments of the disclosed subject matter without departing from the spirit of the invention or its scope, as defined by the appended claims.

What is claimed is:

1. A power factor correction circuit for connection to an off line switch mode type power supply, said supply having an input for connection to an AC line voltage, rectifying means and energy storage capacitor means, said rectifying means having an input connected to said power supply input and an output connected to said energy storage capacitor means, said power factor correction circuit comprising:
   (a) at least one capacitor for connection between said rectifying means input and said energy storage capacitor means;
   (b) at least one inductor for connection between said power supply input and said rectifying means.

2. The power factor correction circuit of claim 1 wherein said at least one capacitor is a single capacitor.

3. The power factor correction circuit of claim 1 further comprising a controllable switch connected in series with said capacitor, said series connected controllable switch and capacitor for connection between said rectifying means and said energy storage capacitor means.

4. The power factor correction circuit of claim 3 wherein said power supply has a LOAD connected to said energy storage capacitor means and means for generating a signal indicative of current amplitude in said LOAD and said power factor correction circuit further comprises control means responsive to said indicative signal for controlling said controllable switch to be open or closed dependent upon said current amplitude.

5. The power factor correction circuit of claim 1 wherein said capacitor is first and second capacitors and wherein said correction circuit further comprises a first controllable switch connected in series with said first capacitor and a second controllable switch connected in series with said second capacitor.

6. The power factor correction circuit of claim 5 wherein said power supply has a LOAD connected to said energy storage capacitor means and means for generating a signal indicative of current amplitude in said LOAD and said power factor correction circuit further comprises control means responsive to said indicative signal for controlling said first and said second controllable switches to change state dependent upon said current amplitude.

7. The power factor correction circuit of claim 6 wherein said first and said second controllable switches each have the same state when said current amplitude has not reached a first predetermined amplitude, said control means controlling said first switch to change state when said current amplitude reaches said first predetermined amplitude, said control means controlling said first switch and said second switch to both change state when said current amplitude reaches a second predetermined amplitude and said control means controlling said first switch to change state when said current amplitude reaches a third predetermined amplitude.

8. In an off line switch mode type power supply having an input for connection to an AC line voltage, rectifying means and energy storage capacitor means, said rectifying means having an input connected to said power supply input and an output connected to said energy storage capacitor means, a power factor correction circuit comprising:
   (a) at least one capacitor connected between said rectifying means input and said energy storage capacitor means; and
   (b) at least one inductor connected between said power supply input and said rectifying means.

9. The power factor correction circuit of claim 8 wherein said capacitor is a single capacitor.

10. The power factor correction circuit of claim 8 further comprising a controllable switch connected in series with said capacitor, said series connected controllable switch and capacitor connected between said rectifying means and said energy storage capacitor means.

11. The power factor correction circuit of claim 10 wherein said power supply has a LOAD connected to said energy storage capacitor means and means for generating a signal indicative of current amplitude in said LOAD and said power factor correction circuit further comprises control means responsive to said indicative signal for controlling said controllable switch to be open or closed dependent upon said current amplitude.

12. The power factor correction circuit of claim 8 wherein said capacitor is first and second capacitors and wherein said correction circuit further comprises a first controllable switch connected in series with said first capacitor and a second controllable switch connected in series with said second capacitor.

13. The power factor correction circuit of claim 12 wherein said power supply has a LOAD connected to said energy storage capacitor means and means for generating a signal indicative of current amplitude in said LOAD and said power factor correction circuit further comprises control means responsive to said indicative signal for controlling said first and second controllable switches to change state dependent upon said current amplitude.

14. The power factor correction circuit of claim 13 wherein said first and second controllable switches each have the same state when said current amplitude has not reached a first predetermined amplitude, said control means controlling said first switch to change state when said current amplitude reaches said first predetermined amplitude, said control means controlling said first switch and said second switch to both change state when said current amplitude reaches a second predetermined amplitude and said control means controlling said first switch to change state when said current amplitude reaches a third predetermined amplitude.

15. A power factor correction circuit for connection to an off line switch mode type power supply, said supply having AC terminals for connection to an AC line voltage, rectifying means having two AC terminals connected to said power supply AC terminals and having two DC terminals, and energy storage capacitor means connected to said two DC terminals, said power factor correction circuit comprising:
   (a) at least one capacitor for connection between one of said rectifying means two AC terminals and said energy storage capacitor means; and
   (b) at least one inductor for connection between said power supply AC terminals and the other of said rectifying means two AC terminals.

16. The power factor correction circuit of claim 15 wherein said capacitor is a single capacitor.

17. The power factor correction circuit of claim 15 further comprising a controllable switch connected in series with said capacitor, said series connected controllable switch and capacitor for connection between said rectifying means and said energy storage capacitor means.

18. The power factor correction circuit of claim 15 wherein said capacitor is first and second capacitors and wherein said correction circuit further comprises a first controllable switch connected in series with said first capacitor and a second controllable switch connected in series with said second capacitor.

19. A power factor corrected off line switch mode type power supply having an input for connection to an AC line voltage comprising:
 (a) rectifying means having an input connected to said power supply input and having an output;
 (b) energy storage capacitor means connected to said rectifying means output; and
 (c) means for correcting said power factor connected between said power supply input, said rectifying means and said energy storage capacitor means.

20. The off line switch mode type power supply of claim 19 wherein said power factor correction means comprises:
 (i) at least one capacitor connected to said rectifying means input and said energy storage capacitor means; and
 (ii) at least one inductor connected between said power supply input and said rectifying means.

21. The off line switch mode type power supply of claim 20 wherein said power factor correction means capacitor is a single capacitor.

22. The off line switch mode type power supply of claim 20 wherein said power factor correction means further comprises a controllable switch connected in series with said power factor correction means capacitor, said series connected controllable switch and capacitor connected to said rectifying means and said energy storage capacitor means.

23. The off line switch mode type power supply of claim 20 wherein said power factor correction means capacitor is first and second capacitors and wherein said correction means further comprises a first controllable switch connected in series with said first capacitor and a second controllable switch connected in series with said second capacitor.

24. The off line switch mode type power supply of claim 23 wherein said power supply has a LOAD connected to said energy storage capacitor means and means for generating a signal indicative of current amplitude in said LOAD and said power factor correction means further comprises control means responsive to said indicative signal for controlling said first and second controllable switches to change state dependent upon said current amplitude.

25. A power factor correction circuit for connection to an off line switch mode type power supply, said supply having an input for connection to an AC line voltage, rectifying means connected to said input and energy storage capacitor means connected to said rectifying means, said power factor correction circuit comprising:
 (a) first and second capacitors for connection to at least said rectifying means;
 (b) at least one inductor for connection to at least said rectifying means; and
 (c) a first controllable switch connected in series with said first capacitor and a second controllable switch connected in series with said second capacitor.

26. The power factor correction circuit of claim 25 wherein said power supply has a LOAD connected to said energy storage capacitor means and means for generating a signal indicative of current amplitude in said LOAD and said power factor correction circuit further comprises control means responsive to said indicative signal for controlling said first and said second controllable switches to change state dependent upon said current amplitude.

27. The power factor correction circuit of claim 26 wherein said first and said second controllable switches each have the same state when said current amplitude has not reached a first predetermined amplitude, said control means controlling said first switch to change state when said current amplitude reaches said first predetermined amplitude, said control means controlling said first switch and said second switch to both change state when said current amplitude reaches a second predetermined amplitude and said control means controlling said first switch to change state when said current amplitude reaches a third predetermined amplitude.

28. The power factor correction circuit of claim 17 wherein said series connected first controllable switch and first capacitor, and said series connected second controllable switch and second capacitor are each also for connection to said energy storage capacitor means.

29. In an off line switch mode type power supply having an input for connection to an AC line voltage, rectifying means connected to said input and energy storage capacitor means connected to said rectifying means, a power factor correction circuit comprising:
 (a) first and second capacitors connected to at least said rectifying means;
 (b) at least one inductor connected to at least said rectifying means; and
 (c) a first controllable switch connected in series with said first capacitor and a second controllable switch connected in series with said second capacitor.

30. The power factor correction circuit of claim 29 wherein said power supply has a LOAD connected to said energy storage capacitor means and means for generating a signal indicative of current amplitude in said LOAD and said power factor correction circuit further comprises control means responsive to said indicative signal for controlling said first and second controllable switches to change state dependent upon said current amplitude.

31. The power factor correction circuit of claim 30 wherein said first and second controllable switches each have the same state when said current amplitude has not reached a first predetermined amplitude, said control means controlling said first switch to change state when said current amplitude reaches said first predetermined amplitude, said control means controlling said first switches and said second switch to both change state when said current amplitude reaches a second predetermined amplitude and said control means controlling said first switch to change state when said current amplitude reaches a third predetermined amplitude.

* * * * *

UNITED STATES PATENT AND TRADEMARK OFFICE
CERTIFICATE OF CORRECTION

PATENT NO. : 4,855,890
DATED : August 8, 1989
INVENTOR(S) : Neil Kammiller It is certified that error appears in the above—identified patent and that said Letters Patent is hereby corrected as shown below:

Column 14, Line 25 - "17" should be changed to --27--.

Signed and Sealed this

Third Day of December, 1991

*Attest:*

HARRY F. MANBECK, JR.

*Attesting Officer*     *Commissioner of Patents and Trademarks*